United States Patent
Einecke

(10) Patent No.: US 9,672,635 B2
(45) Date of Patent: Jun. 6, 2017

(54) METHOD FOR ANALYZING RELATED IMAGES, IMAGE PROCESSING SYSTEM, VEHICLE COMPRISING SUCH SYSTEM AND COMPUTER PROGRAM PRODUCT

(71) Applicant: Honda Research Institute Europe GmbH, Offenbach (DE)

(72) Inventor: Nils Einecke, Offenbach (DE)

(73) Assignee: HONDA RESEARCH INSTITUTE EUROPE GMBH, Offenbach/Main (DE)

(*) Notice: Subject to any disclaimer, the term of this patent is extended or adjusted under 35 U.S.C. 154(b) by 0 days.

(21) Appl. No.: 14/593,494

(22) Filed: Jan. 9, 2015

(65) Prior Publication Data

US 2015/0199818 A1    Jul. 16, 2015

(30) Foreign Application Priority Data

Jan. 10, 2014    (EP) .................................... 14150740

(51) Int. Cl.
*G06T 7/00* (2017.01)
*G06K 9/00* (2006.01)
(Continued)

(52) U.S. Cl.
CPC ............ *G06T 7/32* (2017.01); *G06K 9/00791* (2013.01); *G06K 9/6202* (2013.01);
(Continued)

(58) Field of Classification Search
None
See application file for complete search history.

(56) References Cited

U.S. PATENT DOCUMENTS

2007/0185946 A1* 8/2007 Basri .................. G06K 9/34
708/200
2011/0279652 A1* 11/2011 Eggert ................ G06T 7/0075
348/47

(Continued)

OTHER PUBLICATIONS

European Search Report dated Jul. 18, 2014, issued in corresponding EP Patent Application No. 14150740.0.

(Continued)

*Primary Examiner* — Jason Heidemann
*Assistant Examiner* — Brian Shin
(74) *Attorney, Agent, or Firm* — Squire Patton Boggs (US) LLP

(57) ABSTRACT

A method for analyzing related images corresponding system and vehicle including such system as well as a computer program product for executing the method. The method comprises obtaining at least a first and a second image, defining a pixel patch in the first image for which a correlation shall be calculated, calculating matching cost values between each pixel of the pixel patch in the first image and its corresponding pixel in each of a plurality of pixel patches in the second image, wherein the pixel patches in the second image differ in position in the second image and include the pixel patch with a target position, aggregating the matching cost values of those corresponding pixels of all patches in the second image which match best to generate an aggregation window associated with the target position, and producing a signal including information on the target position.

17 Claims, 2 Drawing Sheets

(51) Int. Cl.
G06T 7/32 (2017.01)
G06K 9/62 (2006.01)
G06T 7/579 (2017.01)
G06T 7/593 (2017.01)

(52) U.S. Cl.
CPC ............ *G06T 7/0075* (2013.01); *G06T 7/579* (2017.01); *G06T 7/593* (2017.01); *G06T 2207/10028* (2013.01); *G06T 2207/20076* (2013.01); *G06T 2207/30252* (2013.01); *G06T 2207/30256* (2013.01)

(56) References Cited

U.S. PATENT DOCUMENTS

2012/0155747 A1* 6/2012 Hwang ................ G06T 7/0075 382/154
2013/0038698 A1* 2/2013 Yoshida ............. H04N 13/0022 348/47

OTHER PUBLICATIONS

Eric T. Psota et al., "A Local Iterative Refinement Method for Adaptive Support-Weight Stereo Matching," Proceedings of the International Conference on Image Processing, Computer Vision, and Pattern Recognition (IPCV), Jan. 1, 2011.
Nils Einecke, "Stereoscopic Depth Estimation for Online Vision Systems," 2012, Universitatsverlag Ilmenau.

* cited by examiner

US 9,672,635 B2

METHOD FOR ANALYZING RELATED IMAGES, IMAGE PROCESSING SYSTEM, VEHICLE COMPRISING SUCH SYSTEM AND COMPUTER PROGRAM PRODUCT

BACKGROUND

Field

The invention relates to a method for analyzing related images, a corresponding image processing system, a vehicle comprising such a system and a corresponding computer program product. In particular the analysis of the related images relates to depth estimation from stereo images which is preferably used in vehicles that are equipped with driver assistance systems taking advantage of image processing, or autonomous vehicles.

Description of the Related Art

Over the last years a large progress has been made in the field of image processing. The improved analysis results therefore can be used to produce and output information of a real situation in which an image or a sequence of images was captured. Since the result reflects a particular aspect of the real situation it can be used either to assist a person to be aware of this situation and act accordingly or even to assist in performing a necessary action directly. Such systems are known as Advance Driver Assistance Systems (ADAS) for example. Here images of a traffic situation are captured and an analysis of the captured images is performed in order to decelerate or accelerate a vehicle or to alarm the driver when an imminent collision might be observed.

Many other applications might be considered as well, of course. A prominent example for use of image processing systems as well are autonomous devices which become more and more popular to increase the comfort of its owner and/or safety of its user. Such autonomous devices can be autonomous lawn mowers, autonomous cleaning machines that might be used in contaminated areas without the need of an operator in dangerous areas and the like. Nevertheless such autonomous devices still need additional sensors like radar or sonar sensors, bump sensors or the like, because depth estimation is still problematic. For the bump sensors it is a particular disadvantage that in some cases they will not lead to the desired change of driving direction. When for example an obstacle like a branch of a tree that is too high for being hit by the bump sensor is approached the collision cannot be avoided.

All of these vehicles have the problem that using conventional equipment such as cameras only 2D-images can be captured from the real 3D environment. In order to overcome this problem stereoscopic cameras have been developed. With these stereoscopic cameras two images are captured. These two images are captured at the same time but from different locations, because the stereoscopic cameras have two image capturing units, each having its own lens and image sensor. Naturally the two images will differ, because the scenery is captured from two distinct positions of the cameras units. In the past there have already been attempts to exploit such pairs of related images for estimation of depth of object or locations in the images. If such calculation of depth can be performed with satisfying accuracy and reliability advantageous over other distance measurement means can be exploited. Cameras, and consequently also stereoscopic cameras, are of passive nature and therefore energy efficiency is one advantage. Energy efficiency is a general issue, but of course of particular relevance for systems that need to have an energy storage onboard like the accumulator of an autonomous lawn mower. Further scalability of such systems ease the adaptation of the systems, since only the distance between the two camera units (baseline) needs to be altered for using it for another range of distances.

In order to improve the performance of stereoscopic image processing systems different limitations have been addressed in the past. EP 2 386 998 A1 for example suggests a two-stage correlation method for correspondence search in stereoscopic images that deals with the problem of conventional approaches with respect to high contrast. Like in already known calculation of depth in stereoscopic image processing a patch of one of the two images is correlated with patches of corresponding size in the second image to find that patch in the second image that matches the patch in the first image best. From the distance of the best matching patch in the second picture from the patch in the first picture measured in pixels (disparity) it is then possible to calculate a distance or depth of the object.

For so called fronto-parallel objects in the images, this gives satisfying results. Each pixel of the patch that is defined in the first image finds its equivalent in a corresponding patch of same size and shape in the second image. This corresponding patch is similar to the patch in the first image but is located at a position in the second image that is different from the position of the patch in the first image. Thus, it is easy to calculate a measure for the similarity of the two corresponding patches. But naturally not all objects that can be identified in an image are fronto-parallel. This leads to a strong limitation of the usability of stereoscopic image analysis with respect to distance evaluation, for example in driver assistance systems, where typically objects like a road are present which is obviously not fronto-parallel. Not fronto-parallel objects lead to a spatially different arrangement of corresponding pixels in the first image and in the second image. The calculation of a measure for the similarity of pixels of a patch in the first image and of pixels of patch of same size and shape in the second image will lead to difficulties in identifying a disparity for such non fronto-parallel objects.

Stereo computation algorithms which are commonly known are described in "Scharstein, D. and Szeliski, R., (2002). A taxonomy and evaluation of dense two-frame stereo correspondence algorithms. International Journal of Computer Vision 47 (1-3):7-42." But the problem of not fronto-parallel objects is not addressed there.

SUMMARY

It is therefore an object of the present invention to improve the analysis of related images, particularly of at least of one pair of related images.

The problems of the known techniques are overcome by the inventive method, system, vehicles and computer program products according to the appended claims.

With the inventive method related images such as a pair of images that are captured by distinct camera units at the same time are analyzed. The method comprises the steps of:

obtaining at least a first and a second image defining a pixel patch in the first image for which a correlation shall be calculated calculating matching cost values for each pixel of the pixel patch in the first image and its corresponding pixel in each of a plurality of pixel patches in the second image, wherein the pixel patches in the second image differ in position in the second image and include the pixel patch with a target position aggregating the matching cost values of those corresponding pixels of all patches in the second image which match best to generate an aggregation window associated with the target position and producing a signal including information on the target position.

It is obvious that the method and its corresponding apparatus can be applied not only to systems where a pair of images being captured at the same time but from different locations, but also to systems where an optical flow shall be calculated, for example for motion vector estimation/compensation. In that case the pair of images for which the inventive method is performed are consecutive images of one single camera unit. Further, the invention is not limited to only a single pair of related images. Multi camera systems may comprise an arbitrary number of camera units in a known spatial relation to each other. Thus, there may be defined either camera pairs of two camera units like using a plurality of stereoscopic cameras each comprising two camera units. Alternatively one of the camera units may be designated as providing a reference image and each of the other camera units then provides a second image thereby establishing as many pairs of related images as other cameras exist.

The invention has the advantage that not only the pixels that belong to one patch (the one that is located at the target position in the second image) are taken into consideration, when the similarity between a patch of the first image and an area in the second image shall be evaluated. In addition to the pixels of that patch at the target position also pixels of patches that are shifted starting from the patch at the target position are included in the evaluation. Thus, if a pixel that lies out of the patch at the target position in the second image due to distortion of a non fronto-parallel object, it will still contribute to the identification of the target position.

Further advantages and aspects are defined in the subclaims.

It is particularly advantageous that the matching cost values of the corresponding pixels which match best are penalized according to the distance between the target position and their position. Doing so leads to a contribution of those pixels that originally belong to the patch at the target position more than those pixels which belong to one of the others of the plurality of patch in the second image.

For improvement of the result of the inventive method the plurality of patches can comprise a plurality of neighboring patches that are arranged symmetrically with respect to the patch at the target position in the second image. When thus at either side of the patch at the target position at least two patches are present it is preferred that the penalization increases with increasing distance of the position of the pixels which matches best from the target position. This means that pixels for which best matching is determined and which originate from a patch which is closer to the patch at the target position contribute more than pixels for which best matching is determined but which originate from a patch that is farther away from the patch at the target position.

Especially according to a preferred embodiment no penalization is performed for best matching pixels originating from the patch at the target position and penalization for all other best matching pixels is performed using a constant value.

It is preferred that the first and the second image are obtained from a stereo camera, in particular that such stereo camera is used in an advanced driver system or a sensing means of an autonomous device.

When the related images of the pairs are provided by a stereo camera, the positions of the patches in the second image are preferably defined by disparities.

Furthermore it is preferred that a stereoscopic depth is calculated on the basis of the signal including information on the target position.

As a preferred alternative an optical flow is calculated based on the signal including information on the target position.

The present invention generally works for systems in which any measure of a similarity of a defined area in the first image and its corresponding area in the second image shall be evaluated. But it is particularly preferred that the matching cost values are calculated as squared or absolute differences, as normalized cross-correlation values, as absolute differences of rank transformed image values or as hamming distances of census transformed images and that the aggregation of the matching cost values is performed by an averaging summation.

As it was already mentioned, the number of patches in addition to the patch at the target position may be adjusted to the needs concerning the computational performance of the system, the required accuracy or other boundaries. The positions of the neighboring patches of the patch at the target position are thus defined by the target position and a predetermined range. For example, a range can be set by a manufacturer of the inventive system that defines that in addition to the patch at the target position a range of X pixels to either side of the patch at the target position shall be taken into account. According to settings of the system the positions of the neighboring patch can then be determined to cover that range. Either the number of neighboring patches (at each lateral side of the patch at the target position) equals the range defined in pixels so that the resulting neighboring patch overlap, or in order to reduce the computational effort the range is divided by the patch length in that direction so that the neighboring patches do not overlap.

The invention preferably is a vehicle that is equipped with a system configured to carry out the processes and method steps that are explained above, wherein the vehicle is one of a robot device, in particular an autonomous robot device like an autonomous lawn mower; a land vehicle, in particular a car or motorcycle; a sea vehicle; an air or space vehicle.

According to another aspect, a computer program product performing the above method, when executed on a computer, is provided.

Further aspects and features of the invention will now be described with reference to the embodiments shown in the annexed drawings throughout which like references denote like parts.

DETAILED DESCRIPTION

Figure 1:
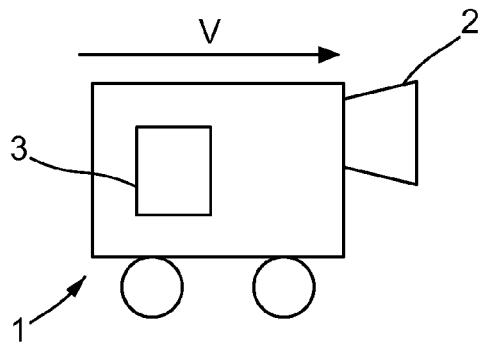
FIG. 1 shows exemplarily and schematically an autonomous vehicle.

An autonomous vehicle 1, as schematically and exemplarily shown in FIG. 1, autonomously moves from a starting point to a destination without planned intervention by a passenger of the autonomous vehicle. On the movement path from the starting point to the destination, the autonomous vehicle en route automatically adapts its movement path to traffic conditions.

In order to perceive its environment, the autonomous vehicle typically comprises a number of sensors sensing the environment but at least an optical sensor system 2, which comprises at least an optical sensor. Basically, sensing in this case means that the autonomous vehicle processes data supplied by the sensors in a processing unit 3 to derive parameters that describe aspects of the environment. Together, the derived parameters form a virtual model of the vehicle's view of the environment.

The autonomous vehicle 1 continuously monitors the parameters and makes decisions based on the parameters, i.e. the result of a calculation or parameter comparison leads to a result which leads to an execution of a specified process. A decision is made, when specific constraints or thresholds are reached by the parameters. While a number of different decisions can be made, for autonomous movement, decisions that lead to movement changes of the vehicle are of interest, as they influence other traffic participants.

For effecting movement changes, the vehicle 1 typically comprises at least actuators for actuating steering, for accelerating or decelerating (braking) the vehicle and/or for communicating with the passengers. After a decision is made, i.e. a process is started, the autonomous vehicle 1 actuates the actuators in accordance with steps, calculations and/or comparisons specified in the respective process.

At least one of the optical sensors is a stereo camera, which is used to produce preferably a sequence of image pairs, e.g. for calculating depth of an object in order to enhance navigation and to avoid objects/obstacles in the movement path of the autonomous vehicle 1 by providing a signal including information of a target position which then allows calculation from the disparity a depth of an object in the image. Of course calculation of a depth of an object might also be combined with calculation of an optical flow from the sequence.

A stereo camera is a type of camera with two lenses with a separate image sensor for each lens. Often, a stereo camera actually consists of two separate cameras attached to a rig. In this case the cameras might either be fixed or movable. In the fixed case the cameras are usually aligned with image sensors being coplanar (parallel setup). In the movable case such a stereo camera is usually used to mimic the vergence movement of human eyes.

The main intention of this invention is to improve the depth estimation performance or depth estimation in stereo or multi-camera systems by supporting the correspondence search between images recorded by the camera systems.

For estimating depth from stereo or multi-camera images it is necessary to find correlating image pixels in the images which belong to one 3D instance in the scene observed with the camera. A multi camera system is similar in the sense that either each pair of cameras can be used as a stereo camera or that one camera is defined as a reference camera and all other cameras are treated like the second camera of a stereo camera system. This means that correlating pixels are either searched in each camera pair or between the reference camera images and the images of all other cameras. In the following, when a stereo camera is referred to, it should be understood, that a multi-camera system can be also used.

Before details of the invention will be explained the principle of performing depth estimation from a pair of images is explained.

After pixel correlations have been found the depth can be easily calculated from the distance between the correlating pixels. The distance between correlating pixels is called disparity and is measured in number of pixels. For example, if the correlating pixels are 5 pixels apart they have a disparity of 5. The depth is computed by the simple formula:

$$\text{Depth} = f*b/\text{disparity}$$

Here, f is the focal length of the camera and b is the baseline. The baseline is the 3D distance between the two cameras.

Finding single pixel correlations is hard. Hence, an area (patch) around each pixel is used for finding correlations. If this area has a rectangular shape this approach is called block-matching. A major problem in finding correlations with patches is that this constitutes an inherent assumption that the depth (or disparity) values of all pixels within that patch are the same because only pixels from the same depth are depicted in the same spatial arrangement in both stereo images. Since the scene observed by a (stereo) camera consists of many surfaces that are not fronto-parallel, the assumption is violated quite often. Fortunately, the approach works well as long as the differences between the different pixel's depth values are not too large.

Figure 2:
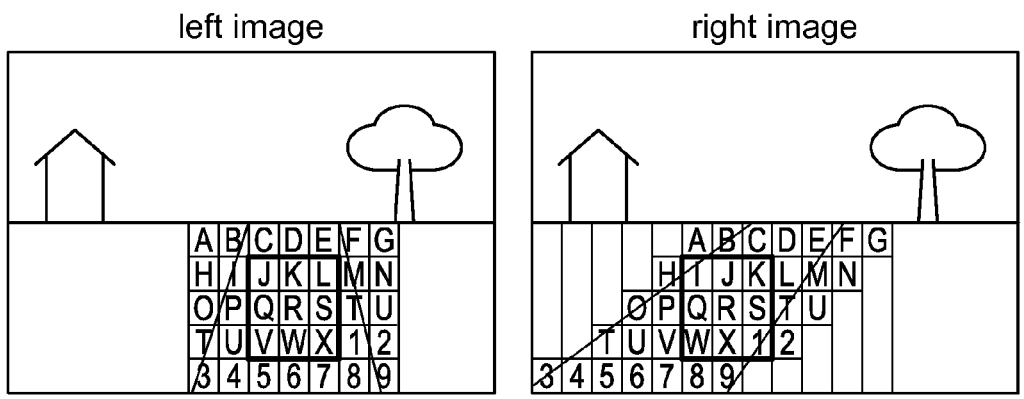
FIG. 2 shows exemplarily and schematically a captured left and right image of a stereo image.

However, for strongly slanted surfaces like a street surface this leads to gross errors as shown on FIG. 2. While fronto-parallel objects like houses or trees look the same in both stereo camera images, strongly slanted surfaces like the street change their spatial 2D layout between the two stereo camera images. Due to this, trying to correlate patches from the left image (e.g. a 3×3 patch around the center pixel R) will fail as the spatial layout of the pixels has changed in the right image.

Typically patch-matching stereo works as follows: In the left image which is the first image in the described embodiment a patch is defined as shown in FIG. 2 by the square of 3×3 pixels in bold lines. This patch is compared to candidate patches in the right image which is in the present example the second image. The comparison is done by computing patch-matching cost (or correlation) values between the respective two patches. The patch in the second image with the best match is determined as corresponding patch, i.e. as being that patch that corresponds to the patch defined in the first image. In most cases this matching cost value is computed by first computing pixel-level cost values and then aggregating the pixel-level cost values over the full patch:

$$C_d = \sum_i c_{i,d}$$

Where $C_d$ is the aggregated patch matching cost value and $c_{i,d}$ is the pixel-level cost of pixel i in the left image patch and its corresponding pixel in the right image patch. In parallel stereo camera setups corresponding pixels are always on the same image line thus, $$c_{i,d} = f_c(p(x_i, y_i)^L, p(x_i-d, y_i)^R)$$

Where $f_c$ is the pixel-level matching cost function, $p(x_i, y_i)^L$ is pixel i in the left image and $p(x_i+d, y_i)^R$ the corresponding pixel in the right image.

After the corresponding patch in the right image is determined further evaluation of the position of the patch in the second (right) image can be performed. The position of the corresponding pixels differs by the disparity d. The essence of the fronto-parallel assumption in standard stereo processing is that all pixels in a patch have the same disparity d and consequently known methods determine only a corresponding patch of equal patch size and patch shape to further determine the disparity of this determined corresponding patch from the patch defined in the first image. Hence, for each disparity d the matching cost value of the patch is also computed from the pixel-level matching cost values of disparity d. The pixel-level cost value may be computed in many ways. In simple cases it might be the absolute difference (AD) between the intensities of the corresponding pixels or in more advances cases it could even incorporate yet another patch (e.g. for computing normalized cross-correlation, rank transform or census transform as mentioned earlier).

Figure 3:
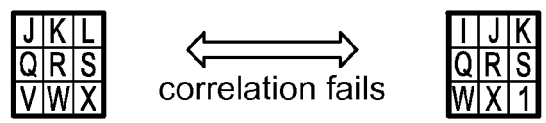
FIG. 3 shows the patches that are evaluated in conventional methods.

As is shown in FIG. 3 such approach will lead to failure in finding a corresponding patch.

In contrast this invention does not simply aggregate the pixel-level cost values of disparity d for the patch disparity d but incorporates pixel-level cost values of multiple disparities (favorably similar for the patch target disparity d) by selecting the best pixel-level disparity (the disparity where the pixel-level cost value is best) for each pixel from a set of disparities, $$C_d = \sum_i \max_{s \in d_s} c_{i,s}$$

where $d_s$ is a set of disparities (favorably similar to the patch target disparity d). One realization of such a set might be a simple disparity range like ±2 pixels, i.e. $d_s = \{d-2, d-1, d, d+1, d+2\}$. The patch target disparity is the distance of a target position of the patch in the second (here: right) image from the position of the defined patch in the left image that is to be determined as corresponding patch for center pixel R.

The problem of the max selection for finding the best pixel-level disparity is that this might cause plateaus in the patch-level matching cost function for neighboring disparities. Hence, it is preferred to penalize pixel-level matching cost values that are from a disparity different than the patch disparity, $$C_d = \sum_i \max_{s \in d_s} P(s, d) c_{i,s}$$

Where P is a penalization that typically increases with the difference between the patch target disparity d and the pixel-level disparity however, it might also be a fixed penalization for all disparities that do not equal the target disparity, or any other kind of penalization.

Figure 4:
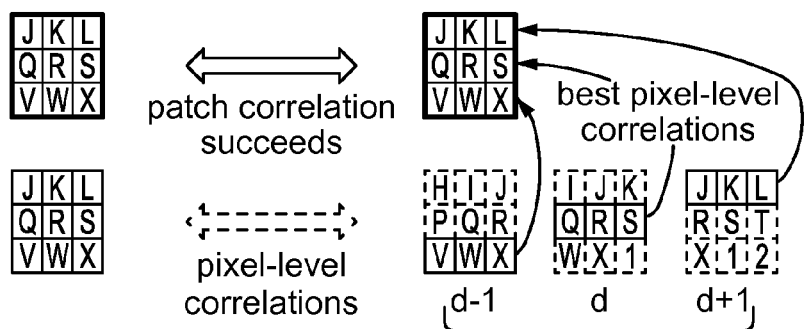
FIG. 4 shows exemplarily and schematically plurality of patches used for determination of corresponding pixels and aggregation of thereof.

FIG. 4 visualizes the concept in an abstract fashion using the same example as in FIG. 2. While the correlation failed in FIG. 3, now the pixel-level correlation for the patch target disparity d and two further disparities, (d−1) and (d+1), are computed first for all of a plurality of patches in the right image, including the patch at a position corresponding to the patch target disparity d. These patches are depicted in the FIG. 4 as the three dashed patches on the lower right. From these pixel-level correlations the best matching for each pixel is selected. In this simplified example the best correlations for the lower pixels are from disparity (d−1), the best for the middle pixels are from the patch target disparity (d) and the best for the upper pixels are from disparity (d+1). These best pixel-level correlations are then aggregated to generate an aggregation window in the second image, possibly with a penalty, to generate a new patch correlation the basis of the patch defined in the first image and the aggregation window in the second image. This is illustrated in the upper half of FIG. 4. It is to be noted that, although the combination is visualized as building a new path, in fact the pixel-level correlation values are not used to actually build a new patch. In fact the pixel-level correlation cost values are aggregated (for example with a weighted average) to calculate the patch-level correlation cost value as mentioned above.

While all the above explanations are concentrating on computing depth from stereo camera images it is also possible to use the same method to improve patch-matching optical flow algorithms. There are two slight differences between the two approaches: First, optical flow is typically computed between two consecutive images from the same camera instead of from two images captured at the same time from two cameras as in the stereo case. Second, it is necessary to look for correlations not only along image lines but within a search window. Thus, the disparities in stereo processing become two-dimensional vectors in optical flow. These vectors are related to the two-dimensional shift that an image patch can undergo from one image to the next. This can be described by whole image shift, i.e. shift one image in the opposite direction of the patch movement. Regarding the search for the best pixel-level correlation, in optical flow the set of possible disparities becomes a set of possible image shifts. Despite these two differences the computation is the same.

Figure 5:
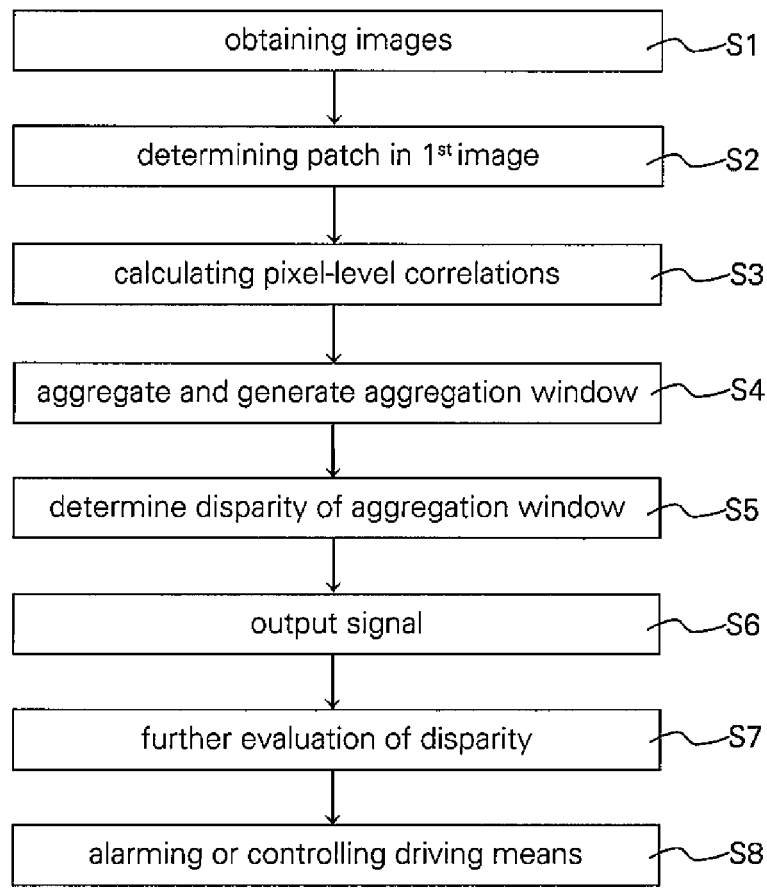
FIG. 5 shows a flowchart illustrating the method steps of the inventive method.

In FIG. 5 there is shown a simplified flowchart of the method steps that have been explained in greater detail above. At first in step S1 the two related images are obtained for which the correlation of patches shall be analyzed. A pair of related images in the sense of the invention can be a pair of images captured at the same time by a stereo camera. Alternatively the related images of the pair have a time relationship, because they have been captured as consecutive images by a single camera unit. A combination of both could also be used as a starting point. This means a sequence of image pairs could be captured by a stereo camera and then either an optical flow or a depth of both could be calculated.

Then in step S2 in a first image which can be any one of the two related images a patch is defined for which a distance of a corresponding patch in the second image shall be determined. For the determination at first matching cost values are calculated. This calculation includes calculating for each pixel of the patch defined in the first image and its corresponding pixel in each of a plurality of patches that have different positions in the second image, a pixel-level cost value. Thus, for each pixel of the patch defined in the first image a plurality of matching cost values is calculated.

Now for each pixel of the patch of the first image the corresponding pixel which matches best is selected. The corresponding matching cost values of all of these best matching pixels originating from any of the plurality of patches in the second image are aggregated in step 4. Thereby an aggregation window is generated associated with the patch target disparity.

The aggregation window which matches best to the patch defined in the first image is then the one that gives the disparity which is output in a signal (step S6). On the basis of such signal it is then possible to further exploit the knowledge about the disparity in step S7. Such exploitation could for example be alarming a driver in an ADAS that a person or another obstacle is in the way and a collision might occur. Also a direct action may be taken on the basis of an estimated distance of an object. For example the route of an autonomous lawn mower may be corrected in order to avoid a collision or in case that the system is implemented in an Advanced Driver Assistance System automated braking may be performed.

The invention claimed is:

1. A method for analyzing related images, comprising the steps of:
obtaining at least a first and a second image;
defining a pixel patch in the first image for which a correlation with a pixel patch at a patch target position in the second image shall be calculated;
calculating matching cost values between each pixel of the pixel patch in the first image and its corresponding pixels in each of a plurality of pixel patches in the second image, wherein the plurality of pixel patches in the second image differ in position in the second image and comprise the pixel patch at the patch target position;
selecting the matching cost values of the corresponding pixels of any of the plurality of pixel patches in the second image which match best;
aggregating the matching cost values of the corresponding pixels of all of the plurality of pixel patches in the second image which match best to generate an aggregation window associated with the patch target position, wherein the aggregation window comprises the best matching pixels from any of the plurality of pixel patches in the second image having multiple disparities at a pixel level, wherein a position of at least one of the pixels in the pixel patch in relation to another one of the pixels in the first image is located in a different position than the at least one of the pixels in the pixel patch in relation to the another one of the pixels in the second image; and
producing a signal including information on the patch target position.

2. The method according to claim 1, wherein
the matching cost values of the corresponding pixels are penalized according to the distance between the patch target position and their position.

3. The method according to claim 2, wherein
the penalization increases with increasing distance of the position of the pixels from the patch target position.

4. The method according to claim 2, wherein
no penalization is performed for the matching cost values of corresponding pixels having the patch target position and penalization for all other matching cost values is performed using a constant value.

5. The method according to claim 1, wherein
the first and the second image are obtained from a stereo camera.

6. The method according to claim 5, wherein
the positions of the patches in the second image are defined by disparities.

7. The method according to claim 1, wherein
a stereoscopic depth is calculated on the basis of the signal including information on the target position.

8. The method according to claim 1, wherein
an optical flow is calculated based on the signal including information on the patch target position.

9. The method according to claim 1, wherein
the matching cost values are calculated as squared or absolute differences and that the aggregation of the matching cost values is performed by an averaging summation.

10. The method according to claim 1, wherein
the matching cost values are calculated as normalized cross correlation values and that the aggregation of the matching cost values is performed by an averaging summation.

11. The method according to claim 1, wherein
the matching cost values are calculated as absolute differences of rank transformed image values and that the aggregation of the matching cost values is performed by an averaging summation.

12. The method according to claim 1, wherein
the matching cost values are calculated as hamming distances of census transformed images and that the aggregation of the matching cost values is performed by an averaging summation.

13. The method according to claim 1, wherein
the positions of the plurality of patches in the second image are defined by the patch target position and a predetermined range.

14. An image processing system configured to perform the method according to claim 1.

15. The image processing system according to claim 14, wherein the system comprises a stereoscopic camera for providing the first and the second image.

16. A vehicle equipped with a system according to claim 14, wherein the vehicle is one of a robot device, in particular an autonomous robot device like an autonomous lawn mower, a land vehicle, in particular a car or motorcycle, a sea vehicle, an air or space vehicle.

17. A non transitory computer readable medium storing a program product performing, when executed on a computer, the method according to claim 1.

* * * * *